United States Patent
Caceres et al.

(10) Patent No.: US 9,888,038 B2
(45) Date of Patent: *Feb. 6, 2018

(54) METHOD AND APPARATUS FOR PROVIDING MOBILE AND SOCIAL SERVICES VIA VIRTUAL INDIVIDUAL SERVERS

(71) Applicants: AT&T Intellectual Property I, L.P., Atlanta, GA (US); Duke University, Durham, NC (US)

(72) Inventors: Ramon Caceres, New York, NY (US); Alexander Varshavsky, Florham Park, NJ (US); Landon Cox, Chapell Hill, NC (US); Harold Vinson Chao Lim, Mountain View, CA (US); Amre Shakimov, Durham, NC (US)

(73) Assignees: AT&T Intellectual Property, L.P., Atlanta, GA (US); Duke University, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,242

(22) Filed: May 6, 2013

(65) Prior Publication Data
US 2013/0247141 A1    Sep. 19, 2013

Related U.S. Application Data

(63) Continuation of application No. 12/622,153, filed on Nov. 19, 2009, now Pat. No. 8,437,365.

(51) Int. Cl.
*H04L 12/66* (2006.01)
*H04L 29/06* (2006.01)

(52) U.S. Cl.
CPC .............. *H04L 63/20* (2013.01); *H04L 12/66* (2013.01)

(58) Field of Classification Search
CPC ..... G06F 9/455; G06F 21/6218; G06Q 30/02; H04L 63/0272; H04L 63/20
See application file for complete search history.

(56) References Cited

U.S. PATENT DOCUMENTS

| 6,343,085 | B1* | 1/2002 | Krishnan et al. | 370/468 |
| 7,539,631 | B1* | 5/2009 | El-Haj | 705/26.1 |
| 2006/0195888 | A1* | 8/2006 | Kalonji et al. | 726/4 |
| 2008/0243853 | A1* | 10/2008 | Reding et al. | 707/9 |
| 2011/0231523 | A1* | 9/2011 | Haugland et al. | 709/219 |

FOREIGN PATENT DOCUMENTS

EP    1860519 A2    11/2007

* cited by examiner

*Primary Examiner* — Yong Zhou

(57) ABSTRACT

A method, computer readable medium and apparatus for providing a virtual individual server service within a communications network are disclosed. For example, the method receives a request from a subscriber of the communications network to subscribe to the virtual individual server service, provides a virtual individual server to the subscriber in response to the request and executes at least one application via the virtual individual server using at least one piece of personal information associated with the subscriber.

20 Claims, 4 Drawing Sheets

METHOD AND APPARATUS FOR PROVIDING MOBILE AND SOCIAL SERVICES VIA VIRTUAL INDIVIDUAL SERVERS

This application is a continuation of U.S. Ser. No. 12/622,153, filed on Nov. 19, 2009, which is currently allowed and is herein incorporated by reference in its entirety.

BACKGROUND

People increasingly generate content on their personal endpoint devices, e.g., mobile devices, laptops, home computers, and the like, and upload the content to a third-party service for sharing and backup purposes. Although these services are convenient and useful, their use has important privacy implications due to their centralized nature and their acquisitions of rights to user-contributed content. For example, if a hacker maliciously attacks the third-party service, the hacker would obtain access to private information of all users that are signed up with the third-party service. In addition, when a user subscribes to a third-party service, they are typically required to sign an agreement that allows the third-party service to sell or share the user's private information. As a result, the user's privacy may be compromised or at risk.

SUMMARY

In one embodiment, the present disclosure discloses a method, a computer readable medium and an apparatus for providing a virtual individual server service within a communications network are disclosed. For example, the method receives a request from a subscriber of the communications network to subscribe to the virtual individual server service, provides a virtual individual server to the subscriber in response to the request and executing at least one application via the virtual individual server using at least one piece of personal information associated with the subscriber.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, a computer readable medium and an apparatus for providing a virtual individual server service within a communications network. Although the present disclosure is discussed below in the context of packet networks, e.g., IP Multimedia Subsystem (IMS) networks, the present disclosure is not so limited. Namely, the present disclosure can be applied to packet networks in general, e.g., Voice over Internet Protocol (VoIP) networks, Service over Internet Protocol (SoIP) networks, wireless networks, and the like.

Figure 1:
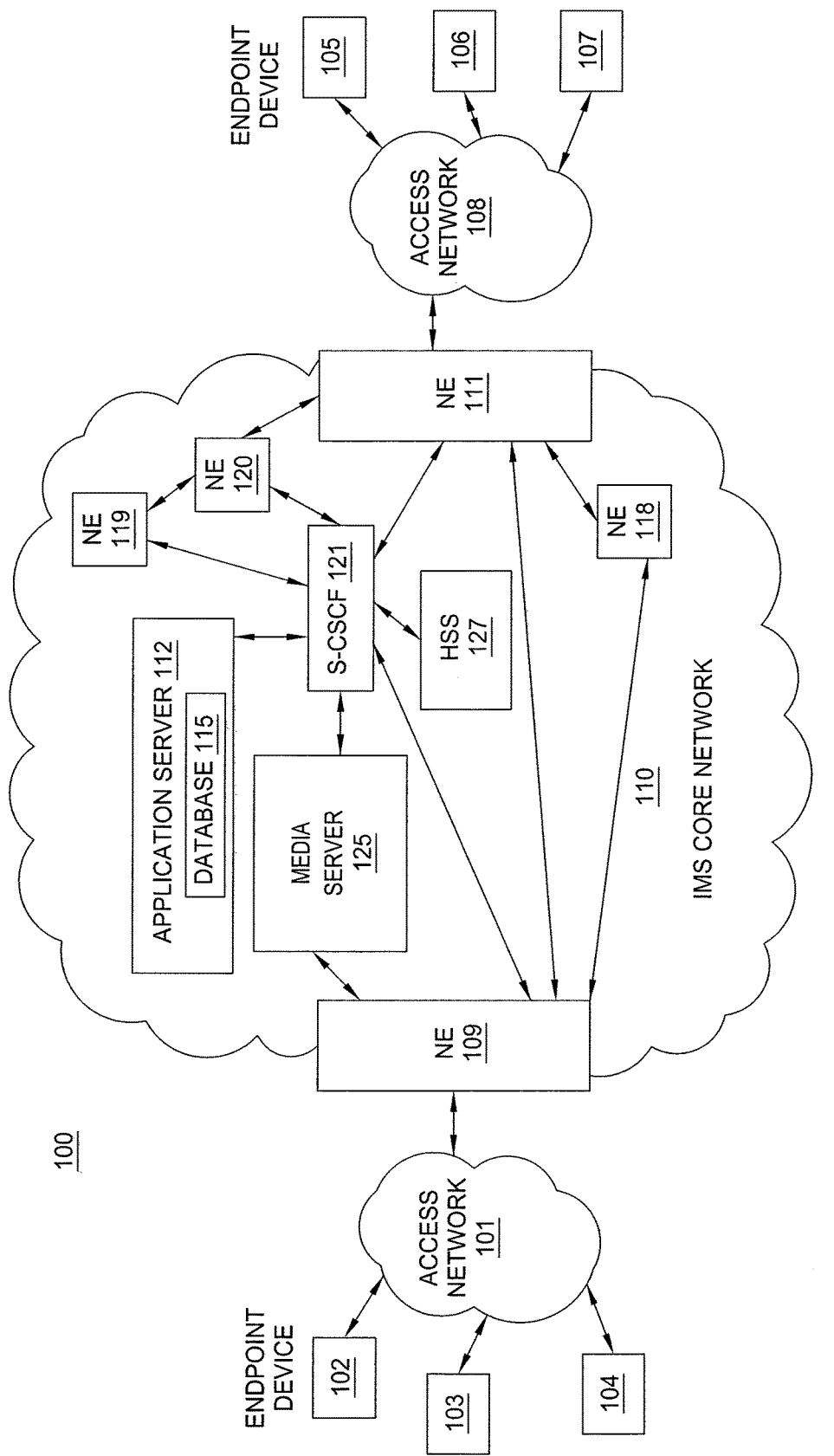
FIG. 1 illustrates an exemplary network related to the present disclosure.

To better understand the present disclosure, FIG. 1 illustrates an example network 100, e.g., an IMS network related to the present disclosure. An IP network is broadly defined as a network that uses Internet Protocol to exchange data packets. Exemplary IMS networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. In addition, a plurality of endpoint devices 105-107 is configured for communication with the IMS core packet network 110 via an access network 108. The network elements 109 and 111 may serve as gateway servers or edge routers for the network 110.

The endpoint devices 102-104 may represent servers that are data sources or other endpoint users. The endpoint devices 105-107 may represent endpoint devices within a subscriber's premises or home. The endpoint devices 102-107 may comprise customer endpoint devices such as wireless telephones, smart phones, wired telephones, personal desktop computers, laptop computers, Personal Digital Assistants (PDAs), video cameras, home appliances, and the like. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving-Call Session Control Function (S-CSCF) 121, a media server 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g. VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g. various VoIP servers). For example, the S-CSCF may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The application server (AS) 112 may comprise any server or computer that is well known in the art, and the database 115 may be any type of electronic collection of data that is also well known in the art. In one embodiment, the AS may contain one or more virtual individual servers for each one of a plurality of subscribers as described below. In addition, one or more AS 112 may be included in the communication system 100. Those skilled in the art will realize that the communication system 100 may be expanded by including additional endpoint devices, access networks, network elements, application servers, etc. without altering the scope of the present disclosure.

The above IP network is described only to provide an illustrative environment in which packets for voice, data and multimedia services are transmitted on networks. The current disclosure discloses a method and apparatus for providing a virtual individual server service within an exemplary communication network illustrated in FIG. 1 and as described above.

Figure 2:
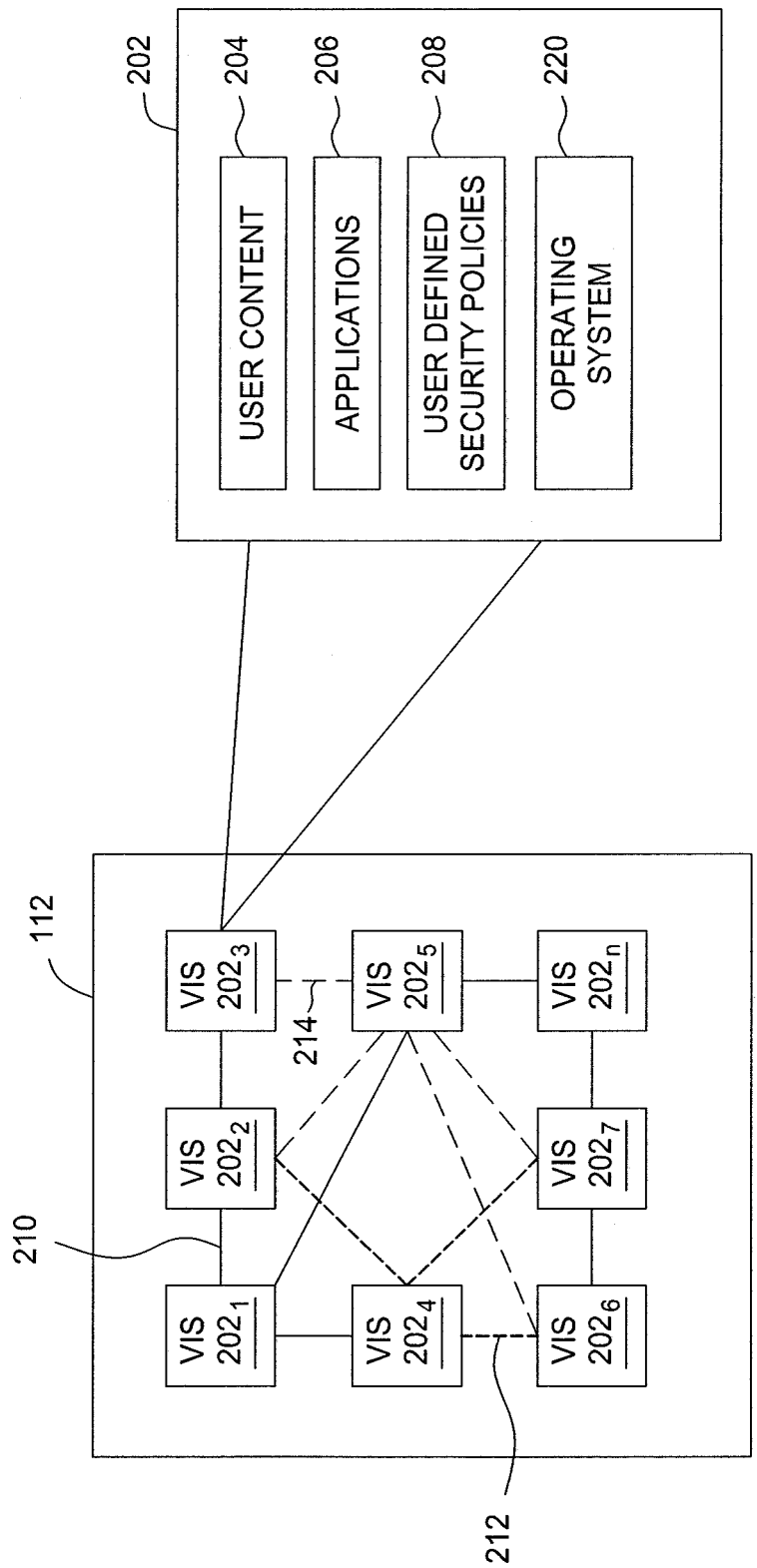
FIG. 2 illustrates a high level block diagram of the present disclosure.

FIG. 2 illustrates a high level block diagram of one or more virtual individual servers (VIS) $202_1$ to $202_n$ (hereinafter also referred to as VIS 202). In one embodiment, the VIS 202 may reside in one or more application servers 112. It should be noted that the VIS 202 may be a part of the application server 112 or may be implemented as part of one or more different pieces of hardware or network elements within the network "cloud" (e.g., the IMS core network 110 illustrated in FIG. 1).

In one embodiment, a communications network service provider may provide VIS 202 as an additional service to subscribers of the communications network. The VIS 202 provides an alternative to users desiring to sign up with third-party service providers of online social networking services, back up storage, locate me services and the like. In other words, by providing a VIS 202 to users from the communication network service provider, no third-party services are required. By avoiding third-party services, privacy concerns associated with information stored by the third party services are avoided.

As discussed above, when a user signs up with a third-party service provider of online social networking services, back up storage, locate me services and the like, security risk is a large concern due to the centralized nature of the third-party service provider. For example, if a hacker maliciously attacks the third-party service, the hacker would obtain access to private or personal information of all users that are signed up with third-party service. The mass amounts of information potentially available to the hacker make the centralized third-party service an attractive target. In addition, the user is typically required to sign agreements before signing up with the service that allow the third-party service provider to sell or disseminate the user's personal information or uploaded content.

However, the VIS 202 provides a user access to various applications such as online social networks, personal email server applications, a personal location server application, a personal back up and synchronization application, a personal web server application, an incoming connection manager application and the like, without sacrificing privacy concerns. It should be noted that each one of the above applications utilizes one or more pieces of personal information or content associated with the user or subscriber. For example, personal information or content may include content uploaded to the VIS 202 by the user or subscriber (e.g., videos, pictures, audio files and the like), location of the user, personal emails, personal blogs, etc. The VIS 202 allows applications to use the personal information associated with a user or subscriber without raising privacy concerns typically associated with signing up with third-party services, as discussed above.

In other words, the VIS 202 should be distinguished from general cloud computing that allows users to run general applications or process data in a distributed processing format. Rather, the VIS 202 provides a user or a subscriber the ability to share and use personal information or content without sacrificing privacy of the user or subscriber. In other words, by signing up for the VIS 202, the user or subscriber owns their own VIS 202. This provides the user or subscriber full control of their respective VIS 202.

In one embodiment, the VIS 202 is a logical partition of processing power and memory within a network cloud (e.g. the IMS core network 110 in FIG. 1). In other words, each VIS 202 is logically separated from each other VIS 202. A user only has access to their own VIS 202 even though each VIS 202 may be located on the same application server 112. Each individual user or subscriber is provided their own VIS 202. In other words, no two users share a VIS 202.

For example, if seven people subscribe to a VIS service, there would be seven separate VIS 202, i.e., one for each subscriber, as illustrated in FIG. 2 by VIS $202_1$-$202_7$. Any number of VIS 202 may be created, e.g., up to VIS 202.

The VIS 202 provides each user complete control of processing and applications executed within their own respective VIS 202. In addition, the VIS 202 removes the processing and memory burden from the subscriber's personal endpoint device, e.g., a mobile endpoint device, home computer and the like.

Another advantage of the VIS 202 is that the VIS 202 is maintained by the communications network service provider. As a result, the subscriber's VIS 202 has more uptime and is maintained 24 hours a day and 7 days a week. For example, if a server running a subscriber's VIS 202 fails, the service provider may simply move the subscriber's VIS 202 to another server that is operating properly.

In addition, as noted above, the VIS 202 provides the user or the subscriber complete control over their privacy. For example, the user determines who has access to their own VIS 202. FIG. 2 illustrates one example of this concept. As a result, the user or subscriber may use the VIS 202 without relinquishing control over their personal or private information or content.

For example, the subscriber of VIS $202_1$ may define an overlay network that is illustrated via lines 210 that include VIS $202_2$, VIS $202_4$ and VIS $202_5$. The subscriber of VIS $202_4$ may define an overlay network that is illustrated via lines 212 that include VIS $202_2$, VIS $202_6$ and VIS $202_7$. The subscriber of VIS $202_5$ may define an overlay network that is illustrated via lines 214 that include VIS $202_2$, VIS $202_3$, VIS $202_6$ and VIS $202_7$. In other words, referring to the overlay network defined by lines 210, personal information and uploaded content of the subscriber of VIS $202_1$ may only be accessed by the subscribers granted permission or authorized by the subscriber of VIS $202_1$, namely VIS $202_2$, VIS $202_4$ and VIS $202_5$ in the example illustrated in FIG. 2. It should be noted that the service provider of the VIS 202 does not have access to share or disseminate the personal information or uploaded content of the subscriber of VIS $202_1$ without the permission of the subscriber of VIS $202_1$.

Moreover, the VIS 202 provides a less attractive target for malicious attacks by hackers than a centralized repository of personal information of millions of users typically found in third-party service providers of online social networks or data back-up and synchronization. To illustrate, if a hacker attacks VIS $202_1$, the hacker would only obtain information associated with the subscriber of the VIS $202_1$. The hacker would need to again attempt to hack into VIS $202_2$ to obtain personal information associated with the subscriber of the VIS $202_2$ and so forth. In one embodiment, each VIS 202 may have a unique security key, password or authentication that is determined by each respective subscriber of VIS $202_1$ to $202_n$. As a result, the hacker may find it more desirable to try and hack a more centralized database of information rather than attempting to individually hack each VIS $202_1$ to $202_n$.

FIG. 2 also illustrates a block diagram of various types of information that may be stored in the VIS 202. In one embodiment, the VIS 202 may store user content 204, one or more applications 206, user defined security policies 208 and an operating system 220. The user content 204 are content uploaded to the VIS 202 by the user and includes, for example, video files, pictures, audio files, documents, hyperlinks and the like.

As discussed above, the user or subscriber of the VIS 202 has complete control over what applications are run on the subscriber's respective VIS 202. In one embodiment, the applications 206 may include an online social network (OSN) application, a personal email server application, a personal location server application, a personal back up and synchronization application, a personal web server application and an incoming connection manager application. Notably, each application uses one or more pieces of personal or private information associated with the user or subscriber.

The OSN application may allow the subscriber of the VIS 202 to share uploaded content with other subscribers. For example, the VIS $202_1$ to VIS $202_n$ may also operate as an OSN. For example, the subscriber of VIS $202_1$ may search for other subscribers having a VIS 202, the subscriber of VIS $202_1$ may invite subscribers of the other VIS $202_2$ to VIS $202_n$ to be part of their overlay network represented by lines 210 and so forth.

However, unlike an OSN operated by a third-party service provider, each subscriber's information and uploaded content is de-centralized and stored on a separate VIS 202. In other words, all of the subscribers' information and uploaded content are not in a centralized location. Moreover, each subscriber maintains complete control over privacy of the information stored in their VIS 202. In other words, by using the VIS 202, the service provider of the communications network offering the VIS as an additional service does not have the authority to sell or disseminate the information or uploaded content of the subscriber of the VIS 202.

The personal location server application allows a user to track and store their location information on their respective VIS 202. However, by using the VIS 202, privacy concerns are alleviated because only other users predetermined by the subscriber are allowed to access the location information stored on the subscriber's VIS 202.

The personal backup and synchronization server application allows a subscriber to use the VIS 202 for privacy-preserving backup and synchronization of personal information (e.g., calendar entries, address book entries, to-do lists, and so forth) that is generated and consumed on both mobile devices and personal computers. The personal web server application allows the VIS 202 to play the role of a general purpose, but privacy-preserving web server for sharing, for example, blogs, photos, videos generated and consumed on both mobile devices and personal computers. The personal email server application allows the VIS 202 to play the role of a privacy-preserving email server to clients running on both mobile devices and personal computers, thus freeing people from their current reliance on third-party email services.

The incoming connection manager application allows the VIS to play the role as an incoming connection manager for its associated mobile devices. In this role, the VIS 202 aggregates notifications and updates from third parties and propagates them to the mobile device only when it is convenient and energy-efficient for the mobile device.

In one embodiment, the user defined security policies 208 may include authentication information, e.g., a password, a encryption key and the like, trusted end point devices of the user, a predefined list of users that can access the VIS 202 of the user, and the like. In other words, the service provider of the VIS 202 has no control over who has access to information stored on a subscriber's VIS 202. Rather, the subscribers have complete control over who has access to the information stored on their respective VIS 202.

In one embodiment, the operating system 220 allows each VIS 202 to be independent from one another. In contrast, third party service providers generally allow subscribers to store information on their servers that all run on a common underlying operating system of the third party service provider. However, allowing each VIS 202 to operate an independent operating system 220 gives the individual user or subscriber complete control over what applications can be run on their own respective VIS 202 and provides another level of customization. For example, one user may want to run a Linux® operating system on his VIS $202_1$ and another user may want to run a Windows® operating system on her VIS $202_2$ and so forth.

Figure 3:
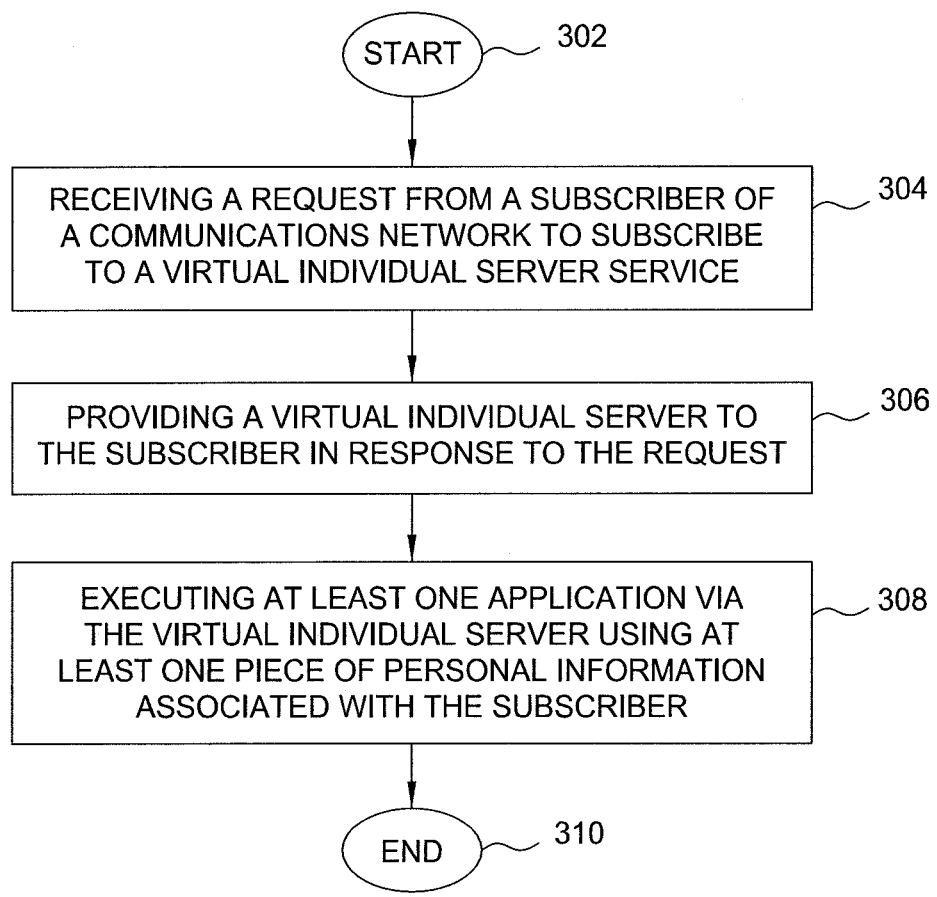
FIG. 3 illustrates a flowchart of a method for providing a virtual individual server service within a communications network.

FIG. 3 illustrates a flowchart of a method 300 for providing a virtual individual server service within a communications network. In one embodiment, one or more steps of the method 300 may be implemented by the application server 112 or a general purpose computer having a processor, a memory and input/output devices as illustrated below in FIG. 4.

The method 300 begins at step 302. At step 304, the method 300 receives a request from a subscriber of a communications network to subscribe to a virtual individual server service or to purchase the virtual individual server. By subscribing to the virtual individual server service or purchasing the virtual individual server, the subscriber possesses ownership rights of the virtual individual server. This is in contrast to third party service providers or cloud computing where the user is simply paying on a per use basis. As a result, the virtual individual server may move with the subscriber. For example, if the subscriber changes service providers, the virtual individual server may be ported with the individual. In one embodiment, the new user or the existing subscriber may send the request via a telephone call to the service provider, online via a computer, and the like.

At step 306, the method 300 provides a virtual individual server to the subscriber in response to the request. In other words, after the new user or the existing subscriber request is processed, the service provider of the communications network provides a virtual individual server to the new user or the existing subscriber. As a result, the subscriber is assigned a virtual individual server, as illustrated in FIG. 2. Moreover, the subscriber has complete control over privacy of content or personal information they store on the virtual individual server, as discussed above.

At step 308, the method 300 executes at least one application via the virtual individual server using at least one piece of personal information associated with the subscriber. For example, the subscriber may have complete control over what applications are run on the subscriber's virtual individual server, as discussed above. For example, the subscriber may use the virtual individual server to execute or run one or more applications without sacrificing privacy as required with third-party service providers. In one embodiment, the at least one application includes at least one of an online social network (OSN) application, a personal email server application, a personal location server application, a personal back up and synchronization application, a personal web server application and an incoming connection manager application. The method 300 ends at step 314.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application.

Figure 4:
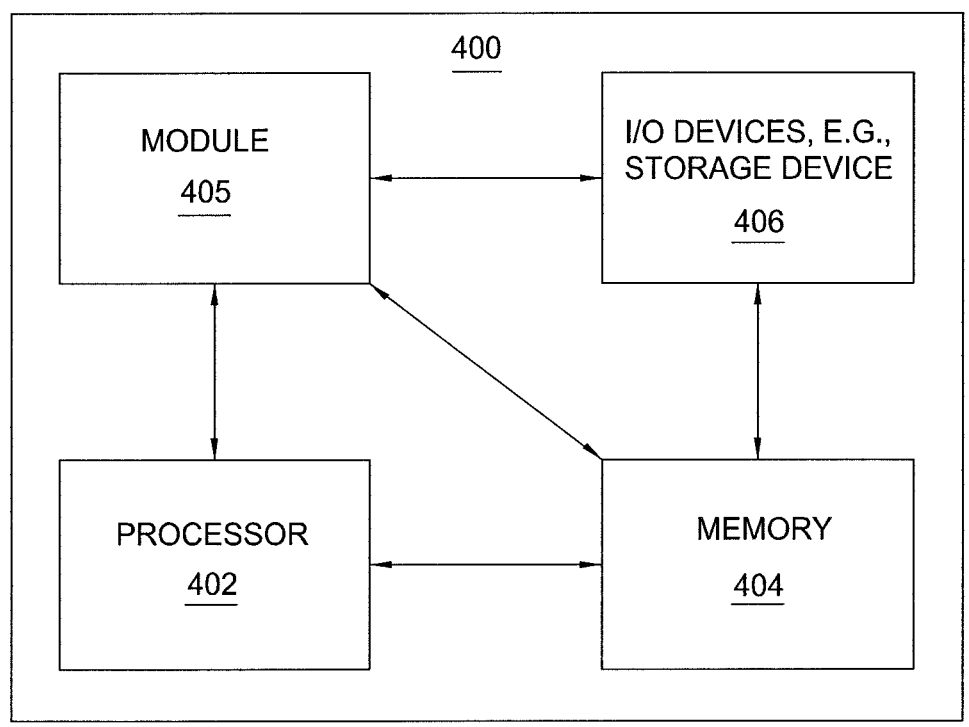
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a virtual individual server service, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for providing a virtual individual server service can be loaded into memory 404 and executed by processor 402 to implement the functions as discussed above. As such, the present method 405 for providing a virtual individual server service (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a virtual server service within a communications network, comprising:

receiving, by a processor, a request from a subscriber of a plurality of subscribers of the communications network to subscribe to the virtual server service;

providing, by the processor, a respective virtual individual server to the subscriber in response to the request, wherein the subscriber has full control of the respective virtual individual server and the subscriber has exclusive control over determining another subscriber of the plurality of subscribers to have access to the respective virtual individual server provided to the subscriber, wherein a service provider does not have access to the respective virtual individual server without permission from the subscriber; and executing, by the processor, an application via the respective virtual individual server using a piece of personal information associated with the subscriber.

2. The method of claim 1, wherein the respective virtual individual server comprises a portion of processing power and a portion of memory within the communications network dedicated to the subscriber.

3. The method of claim 2, wherein the respective virtual individual server is logically partitioned from different virtual individual servers associated with other subscribers of the plurality of subscribers of the virtual server service provided by the communications network.

4. The method of claim 1, further comprising:

receiving the piece of personal information from the subscriber; and storing the piece of personal information in the respective virtual individual server.

5. The method of claim 1, wherein the subscriber maintains control over a software executed in the respective virtual individual server.

6. The method of claim 1, wherein the subscriber defines a security policy of the respective virtual individual server to determine who is allowed to access the respective virtual individual server of the subscriber.

7. The method of claim 6, wherein the security policy comprises a list of users who are allowed to access the respective virtual individual server of the subscriber.

8. The method of claim 1, wherein the application comprises an online social network application.

9. A non-transitory computer-readable medium storing a plurality of instructions which, when executed by a processor, cause the processor to perform operations for providing a virtual server service within a communications network, the operations comprising:

receiving a request from a subscriber of a plurality of subscribers of the communications network to subscribe to the virtual server service;

providing a respective virtual individual server to the subscriber in response to the request, wherein the subscriber has full control of the respective virtual individual server and the subscriber has exclusive control over determining another subscriber of the plurality of subscribers to have access to the respective virtual individual server provided to the subscriber, wherein a service provider does not have access to the respective virtual individual server without permission from the subscriber; and executing an application via the respective virtual individual server using a piece of personal information associated with the subscriber.

10. The non-transitory computer readable medium of claim 9, wherein the respective virtual individual server comprises a portion of processing power and a portion of memory within the communications network dedicated to the subscriber.

11. The non-transitory computer readable medium of claim 10, wherein the respective virtual individual server is logically partitioned from different virtual individual servers associated with other subscribers of the plurality of subscribers of the virtual individual server service provided by the communications network.

12. The non-transitory computer readable medium of claim 9, further comprising:
    receiving the piece of personal information from the subscriber; and
    storing the piece of personal information in the respective virtual individual server.

13. The non-transitory computer readable medium of claim 9, wherein the subscriber maintains control over a software executed in the respective virtual individual server.

14. The non-transitory computer readable medium of claim 9, wherein the subscriber defines a security policy of the respective virtual individual server to determine who is allowed to access the respective virtual individual server of the subscriber.

15. The non-transitory computer readable medium of claim 14, wherein the security policy comprises a list of users who are allowed to access the respective virtual individual server of the subscriber.

16. The non-transitory computer readable medium of claim 9, wherein the application comprises an online social network application.

17. An apparatus for providing a virtual server service within a communications network, comprising:
    a processor; and
    a tangible computer-readable medium storing a plurality of instructions which, when executed by the processor, cause the processor to perform operations, the operations comprising:
        receiving a request from a subscriber of a plurality of subscribers of the communications network to subscribe to the virtual server service;
        providing a respective virtual individual server to the subscriber in response to the request, wherein the subscriber has full control of the respective virtual individual server and the subscriber has exclusive control over determining another subscriber of the plurality of subscribers to have access to the respective virtual individual server provided to the subscriber, wherein a service provider does not have access to the respective virtual individual server without permission from the subscriber; and
        executing an application via the respective virtual individual server using a piece of personal information associated with the subscriber.

18. The apparatus of claim 17, wherein the respective virtual individual server comprises a portion of processing power and a portion of memory within the communications network dedicated to the subscriber.

19. The apparatus of claim 18, wherein the respective virtual individual server is logically partitioned from different virtual individual servers associated with other subscribers of the plurality of subscribers of the virtual server service provided by the communications network.

20. The apparatus of claim 17, further comprising:
    receiving the piece of personal information from the subscriber; and
    storing the piece of personal information in the respective virtual individual server.

* * * * *